United States Patent [19]
Horaguchi

[11] Patent Number: 6,078,408
[45] Date of Patent: Jun. 20, 2000

[54] IMAGE READING DEVICE

[75] Inventor: Yoichi Horaguchi, Tajimi, Japan

[73] Assignee: Brother Kogyo Kabushiki Kaisha, Nagoya, Japan

[21] Appl. No.: 08/876,534

[22] Filed: Jun. 16, 1997

[30] Foreign Application Priority Data

Jun. 20, 1996 [JP] Japan .................................. 8-159777

[51] Int. Cl.$^7$ .................................................. H04N 1/04
[52] U.S. Cl. .......................................... 358/475; 358/474
[58] Field of Search .................................. 358/475, 474, 358/471, 400, 496, 487, 505, 506, 409, 408; 382/312; 248/466, 476; 250/234, 235, 236; 355/45; 359/198; H04N 1/04

[56] References Cited

U.S. PATENT DOCUMENTS 5,159,484  10/1992  Yanagisawa ........................... 359/198
5,638,189   6/1997  Yanagisawa ........................... 358/474
5,883,727  12/1998  Tai ........................................ 358/475

*Primary Examiner*—Cheukfan Lee
*Attorney, Agent, or Firm*—Oliff & Berridge, PLC

[57] ABSTRACT

A mirror frame for an image forming apparatus has first and second mirror holders for holding a reflection mirror at two different locations and angular orientations. The reflection mirror is installed in either the first or second holder, depending on the type of condenser lens unit used in the device, so that a light beam used to read a document is accurately focused on a light receiving device. The apparatus may also include a V-shaped condenser lens unit mounting frame that allows different sized condenser lens units to be used on the same frame.

20 Claims, 6 Drawing Sheets

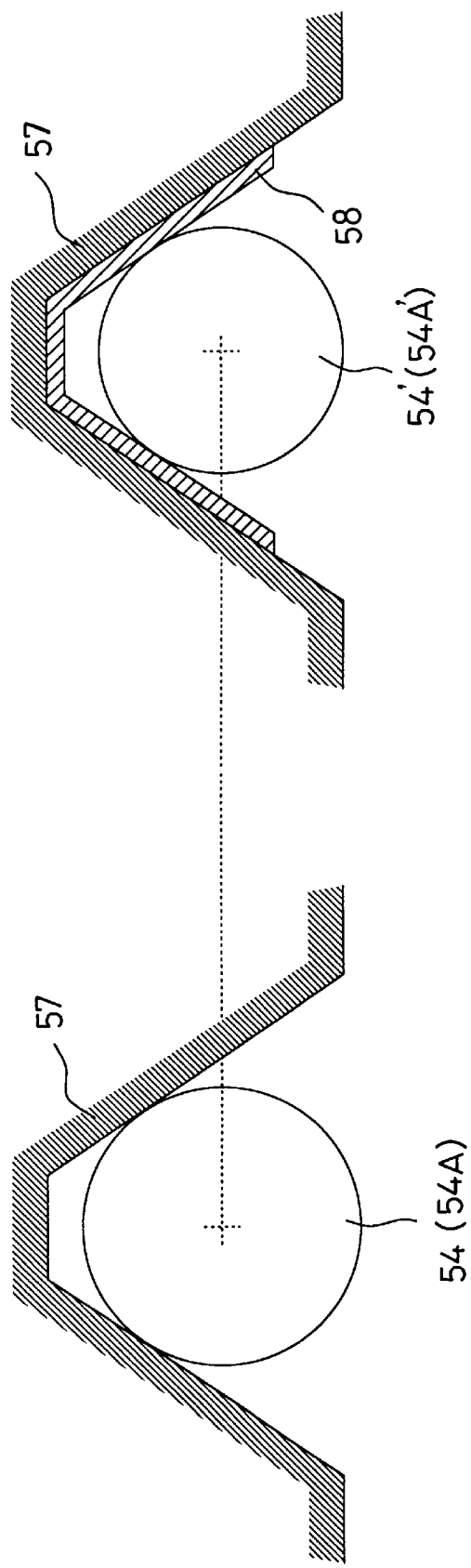

IMAGE READING DEVICE

BACKGROUND OF THE INVENTION

1. Field of the Invention

This invention relates to an image reading device for use in, for example, a facsimile apparatus, and more particularly to an image reading device in which two or more reflection mirror holders are provided on a mirror frame so that a reflection mirror can be located at two different positions and angular orientations. This, in turn, allows the image reading device to utilize two or more types of condenser lens units for focusing a light beam on a reading device.

2. Description of Related Art

FIG. 5A is a sectional side view of an image reading device used in a facsimile apparatus shown in FIG. 5B. As shown in FIG. 5A, a document P inserted from a document inlet 61 is fed by feed rollers 62 and an image on the surface of the document is read by an image reading device 50 at an image reading position Q while the document is pressed by a document presser 63 to remove its slack. The image reading device 50 comprises a light emitting unit 51, a first reflection mirror 52, a second reflection mirror 53, a condenser lens unit 54, and a light receiving unit 55.

The light emitting unit 51 is provided with a plurality of linearly arranged light emitting elements. A light beam is emitted from the light emitting elements onto the document P, and the light beam is reflected from the surface of the document P to generate a reflected light beam R for reading. The reflected light beam R enters a cylindrical condenser lens unit 54, having one or more condenser lenses 54A, via the first reflection mirror 52 and the second reflection mirror 53. The first and second reflection mirrors are mounted on a mirror frame 56. The reflected light beam R is condensed onto the light receiving unit 55 by the condenser lens unit 54, and thereby an image on the document P is formed on the light receiving unit 55.

The light receiving unit 55 is provided with a plurality of linearly arranged charge collecting devices (CCDS), each of which outputs a voltage corresponding to the intensity of the reflected light beam R entering the light receiving unit 55. Thus, when the reflected light beam R is condensed on the receiving unit 55, the image on the document P is read as electrical signals. The document P from which the image has been read is fed to discharge rollers 64 and discharged from a document outlet 65 to the outside of the facsimile apparatus.

As described above, the reflected light beam is required to enter the light receiving unit 55 accurately to read the image on the document P. For this purpose, the reflection mirrors 52 and 53 and the condenser lens unit 54 are mounted accurately at predetermined angles in their mounting positions on the mirror frame 56.

The condenser lenses 54A used for the condenser lens unit 54 vary in a distance between an object and an imaging point, and in their outside diameter, depending on the type and manufacturer. As a result, there has been a problem in that two or more types of condenser lens units 54 cannot be used on one type of mirror frame 56, and a mirror frame 56 must be prepared for each type of condenser lens unit 54.

SUMMARY OF THE INVENTION

The present invention intends to solve the foregoing problems and therefore an object of the present invention is to provide an image reading device wherein two or more types of condenser lenses can be used on one type of mirror frame.

According to a first aspect of the invention, an image reading device comprises a light emitting unit provided with light emitting elements which emit a light beam to a document, at least one reflection mirror that changes the direction of a reflected light beam that is generated when the emitted light beam is reflected from the document surface, a condenser lens unit that condenses the light beam reflected by the reflection mirror, and a light receiving unit that receives the reflected and condensed light beam. The image reading device further includes a mirror frame on which the reflection mirror is mounted, and at least one mirror holder on said mirror frame for holding said reflection mirror. The mirror holder has at least two holding portions, each of which is capable of holding a reflection mirror at a different position. Since the mirror holder of the image reading device has at least two holding portions each of which is capable of holding a reflection mirror at a different position, a plurality of condenser lenses varying in distance between an object and imaging point and outside diameter can be used on the mirror frame by selecting the mirror holding portion to which the reflection mirror is attached.

According to a second aspect of the invention, said mirror holders are provided so that each of said mirror holding portions holds a reflection mirror in a different position or at a different angle.

A third aspect of the invention relates to methods of mounting the condenser lens unit on the mirror frame. According to the third aspect of the invention, the image reading device further comprises a lens frame for holding the condenser lens which is formed integrally with the mirror frame. Therefore, the positions and angles of the reflection mirrors and the condenser lens units can be predetermined, facilitating assembly work.

According to a fourth aspect of the invention, the image reading device further comprises a lens frame for holding the condenser lens unit, the outside shape of which is formed like a letter V. The outside shape of the condenser lens unit is cylindrical, so that it can be positioned in the lens frame. Because the lens frame holding the cylindrical condenser lens unit is V-shaped, a center of the condenser lens will shift only vertically, and not horizontally, when a condenser lens of different outside diameter is held in the lens frame. Thus, the mirror holder can be constructed such that the holding angle is adjustable only in the vertical direction, and not in the horizontal direction, thus facilitating fabrication of the mirror holder.

According to a fifth aspect of the invention, the mirror holder has at least two holding portions for holding a reflection mirror that reflects a light beam directly into the condenser lens unit. The reflection mirror mounting position or angle is changed depending on the holding position that is used so that the light beam directly enters the condenser lens. This allows the mirror holding position and angle to be easily established depending on the condenser lens unit that is used.

According to a sixth aspect of the invention, the number of reflection mirror holding portions on the mirror frame is larger than the number of reflection mirrors. In the image reading device in the above aspect of the invention, the mirror holding portion to which the reflection mirror is attached can be selected according to the condenser lens to be used. Therefore, two or more types of condenser lenses can be used on one type of mirror frame.

In the image reading device according to the present invention, since a plurality of types of condenser lenses can be used on one type of mirror frame, there is no need to prepare a mirror frame for each condenser lens, resulting in a reduction of design costs for preparing new parts or production costs for producing molds or the like. In addition, the use of a plurality of types of condenser lenses on one type of mirror frame facilitates parts management.

BRIEF DESCRIPTION OF THE DRAWINGS

Preferred embodiments of the present invention will be described in detail with reference to the following figures wherein:

FIG. 6A is a front view partially showing a related art device where a large outside diameter condenser lens unit is mounted on a lens frame; and FIG. 6B is a front view partially showing a related art device where a small outside diameter condenser lens unit is mounted on the a lens frame.

DETAILED DESCRIPTION OF PREFERRED EMBODIMENTS

Figure 5A:
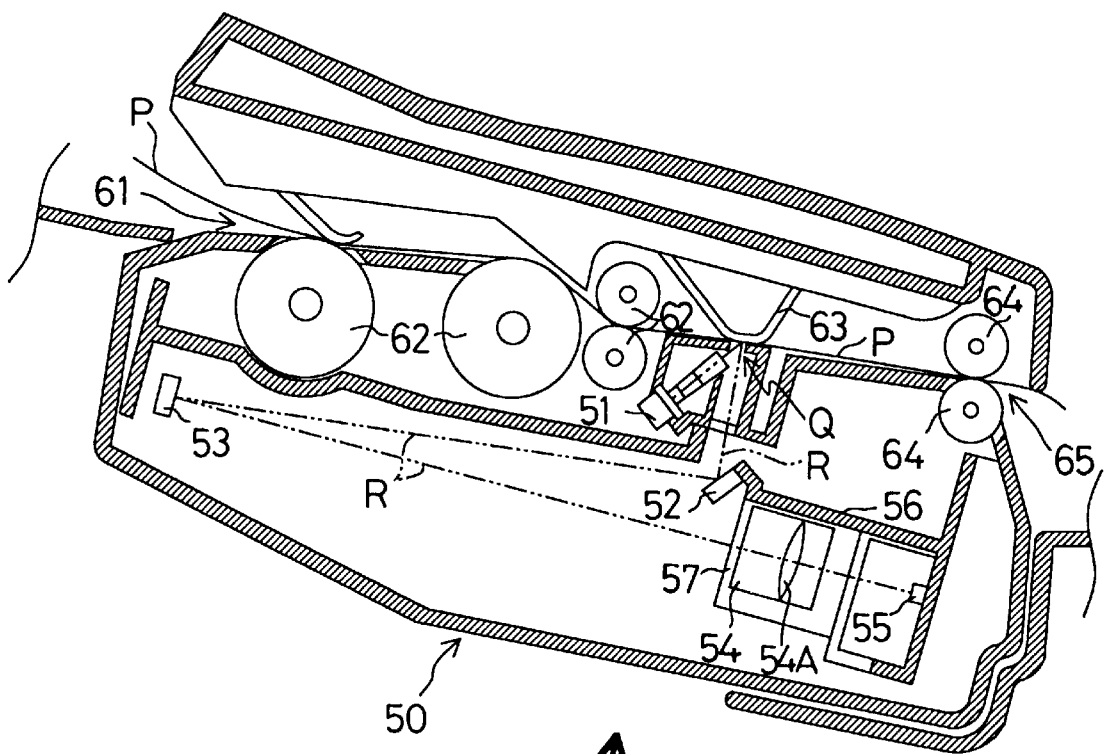
FIG. 5A is a partial sectional side view of a prior art image reading device used in a facsimile apparatus.
Figure 5B:
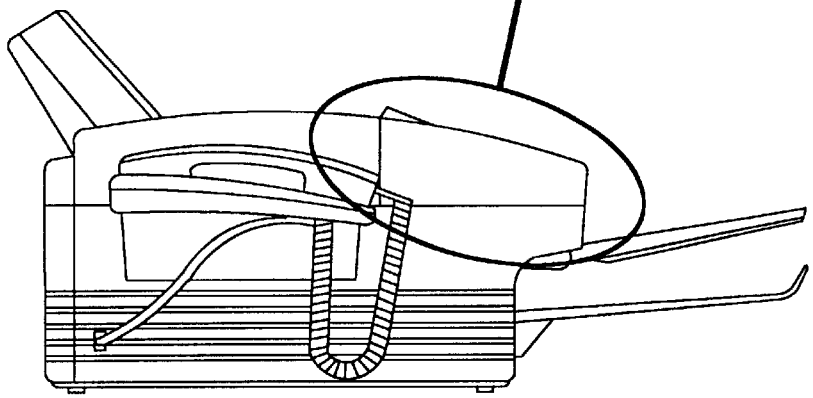
FIG. 5B is a side view of the facsimile apparatus.

A preferred embodiment of the present invention will be described below using the accompanying drawings. An image reading device in a preferred embodiment of the invention is used for a document reading section of a facsimile apparatus. Since the basic structure of the image reading device is the same as the prior art device which was previously described with reference to FIG. 5A, the same reference numbers designate the same parts in several of the drawing figures, and a description of the basic parts of the device will be omitted.

In a preferred embodiment, improvements have been made to a mirror frame 1 which holds reflection mirrors 52 and 53 (53') and a condenser lens unit 19 (19'). More specifically, the mirror frame 1 in the preferred embodiment is provided with two holders which hold a second reflection mirror 53 (53') that reflects a light beam R1 (R2) directly into a condenser lens unit 19 (19').

Figure 1:
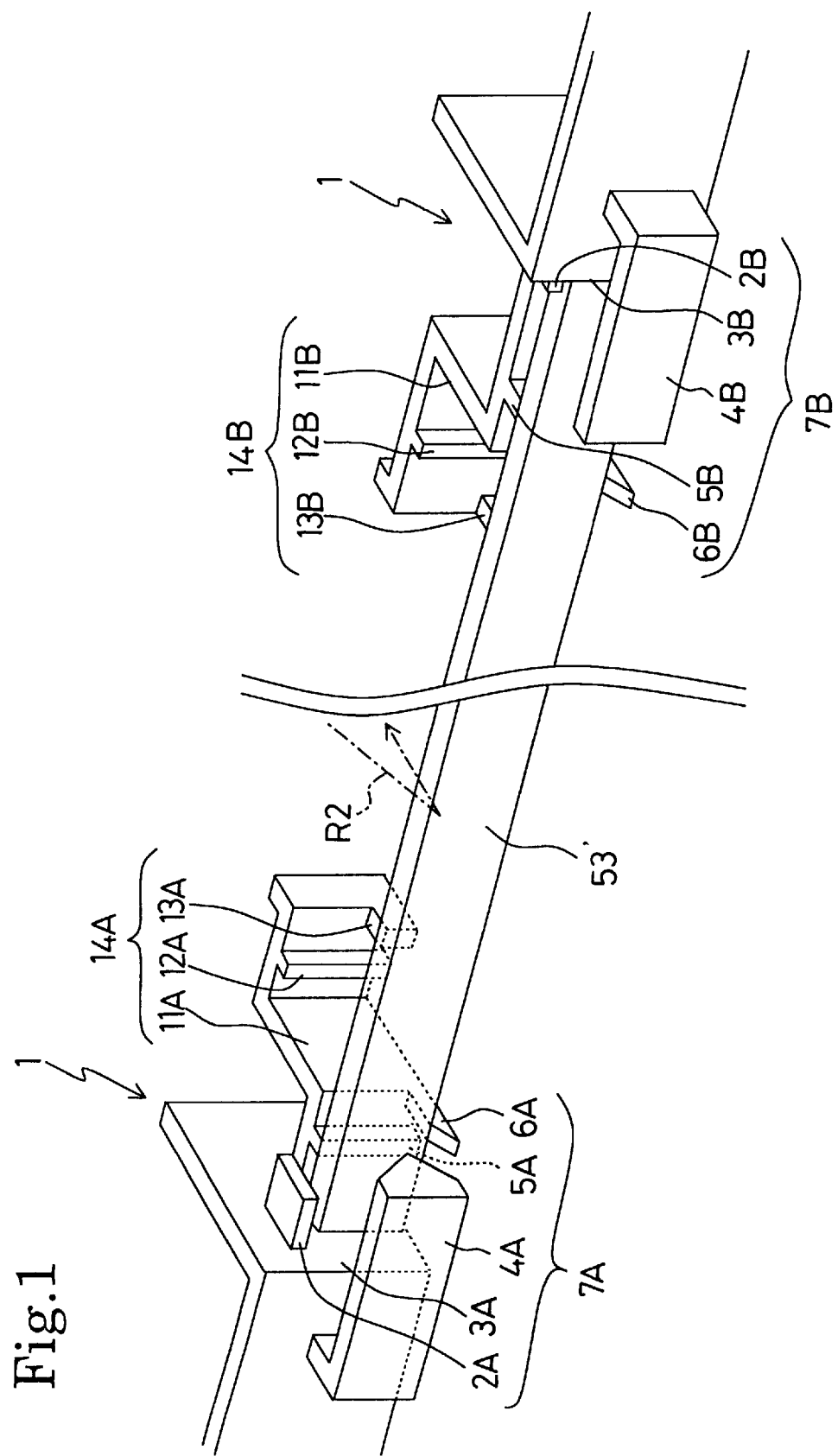
FIG. 1 is an enlarged perspective view showing a first pair of mirror holders on a mirror frame holding a reflection mirror in an image reading device.
Figure 2:
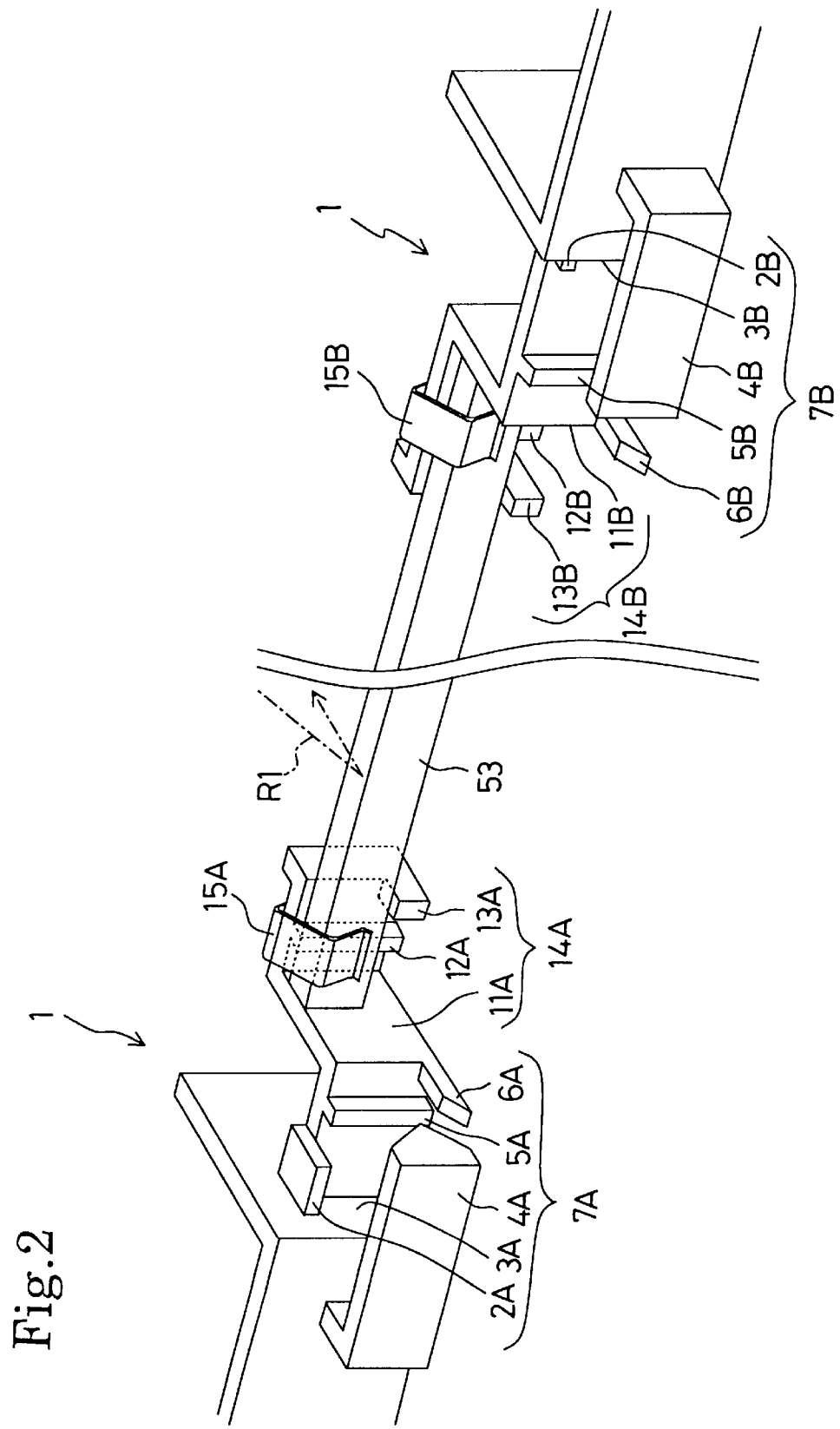
FIG. 2 is an enlarged perspective view showing a second pair of mirror holders on the mirror frame holding a reflection mirror in an image reading device.

FIG. 1 and FIG. 2 are enlarged partial perspective views showing the mirror holders that hold the second reflection mirror 53 (53') on the mirror frame 1. The mirror frame 1 includes a first pair of mirror holders 7A and 7B and a second pair of mirror holders 14A and 14B. FIG. 1 shows a state where the second reflection mirror 53' is held by the first pair of mirror holders 7A and 7B, while FIG. 2 shows a state where the second reflection mirror 53 is held by the second pair of mirror holders 14A and 14B.

Referring to FIG. 1, the first pair of mirror holders 7A and 7B comprise a pair of upward removal prevention ribs 2A and 2B, a pair of side walls 3A and 3B, a pair of pressing members 4A and 4B, a pair of reflection surface positioning ribs 5A and 5B, and a pair of vertical positioning ribs 6A and 6B. The pair of side walls 3A and 3B, prevents the second reflection mirror 53' from rattling or moving longitudinally. For this purpose, the distance between the side walls 3A and 3B are made approximately equal to the length of the second reflection mirror 53'. On the side walls 3A and 3B, there are upward removal prevention ribs 2A and 2B. Below the upward removal prevention ribs 2A and 2B, there are vertical positioning ribs 6A and 6B which are opposed to the upward removal prevention ribs 2A and 2B. The vertical positioning ribs 6A and 6B are formed to a predetermined height which determines the vertical position of the second reflection mirror 53'. The vertical positioning ribs 6A and 6B also prevent, in association with the upward removal prevention ribs 2A and 2B, the second reflection mirror 53' from being moved upward or downward.

Each pressing member 4A, 4B is fixed to the mirror frame 1 at one end and the other end is a free end composed of an elastic synthetic resin spring. The tips of the free ends of the pressing members 4A and 4B are projected respectively towards the reflection surface positioning ribs 5A and 5B, which are opposed to the pressing members 4A and 4B. The reflection surface positioning ribs 5A and 5B are brought into contact with the back side of the second reflection mirror 53' when the pressing members 4A and 4B press against the second reflection mirror 53'. In this way, the horizontal position and inclination of the second reflection mirror 53' are determined according to the projection and inclination of the reflection surface positioning ribs 5A and 5B.

Referring now to the FIG. 2, the second pair of mirror holders 14A and 14B comprise a pair of side walls 11A and 11B, a pair of reflection surface positioning ribs 12A and 12B, and a pair of vertical positioning ribs 13A and 13B. These elements hold both ends of the second reflection mirror 53 in association with separate pressing members 15A and 15B, which are composed of leaf springs.

The pair of side walls 11A and 11B, prevent the second reflection mirror 53 from rattling or moving longitudinally. For this purpose, the distance between the side walls 11A and 11B are made approximately equal to the length of the second reflection mirror 53. Although in FIGS. 1 and 2 the distance between the side walls 11A and 11B of the second mirror holders 14A and 14B is narrower than that between the side walls 3A and 3B of the first mirror holders 7A and 7B, both distances may be made equal.

Projecting from the walls extending from the side walls 11A and 11B are the reflection surface positioning ribs 12A and 12B and the vertical positioning ribs 13A and 13B, respectively. The reflection surface positioning ribs 12A and 12B are brought into contact with the back side of the second reflection mirror 53 when the pressing members 15A and 15B press the second reflection mirror 53 against the reflection surface positioning ribs 12A and 12B. In this way, the horizontal position and inclination of the second reflection mirror 53 are determined according to the projection and inclination of the reflection surface positioning ribs 12A and 12B.

The vertical positioning ribs 13A and 13B are formed to a predetermined height to determine the vertical position of the second reflection mirror 53. The vertical positioning ribs 13A and 13B also prevent, in association with the pressing members 15A and 15B, the second reflection mirror 53 from being moved upward or downward.

Figure 3B:
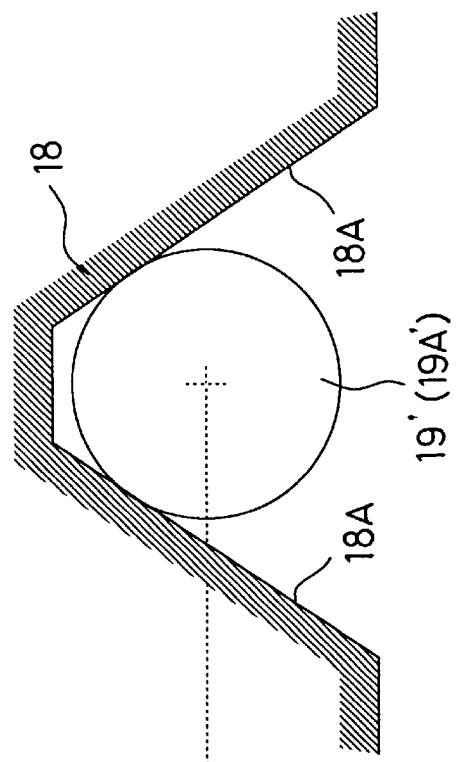
FIG. 3B is a front view partially showing a small outside diameter condenser lens unit mounted on the lens frame.
Figure 3A:
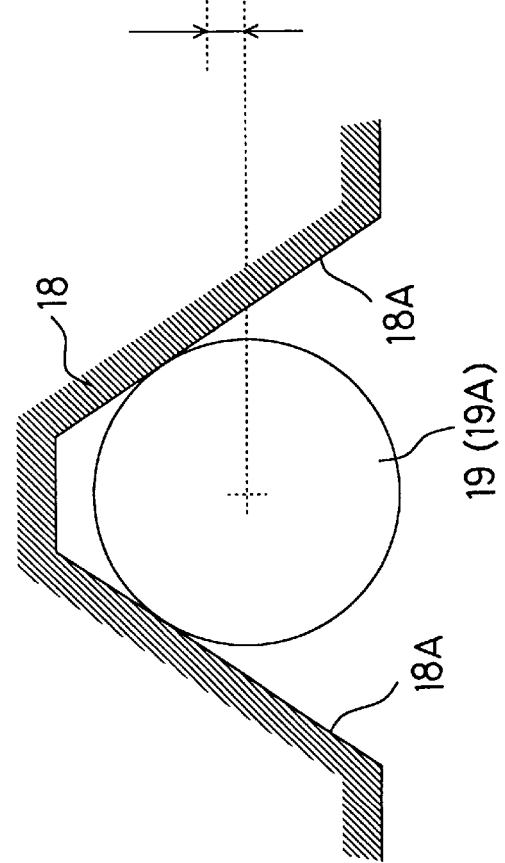
FIG. 3A is a front view partially showing a large outside diameter condenser lens unit mounted on a lens frame.

FIGS. 3A and 3B show a condenser lens unit 19 (19') mounted on a lens frame 18. The lens frame 18 is an inverted V-shape and it is formed integrally with the mirror frame 1 on which the first pair of mirror holders 7A and 7B and the second pair of mirror holders 14A and 14B are formed. The condenser lens unit 19 (19') is a cylindrical unit having one or more condenser lenses 19A (19A'). The condenser lens unit 19 (19') is pressed upward while its outer circumference is kept in contact with the inner walls 18A of the lens frame 18.

To use a plurality of types of condenser lens units on one type of mirror frame, there has been a proposal as described below. As shown in FIG. 6A, the condenser lens unit 54 is mounted on an inverted V-shaped lens frame 57 formed on the mirror frame 56. When a condenser lens unit of different outside diameter, for example, a condenser lens unit of smaller outside diameter 54' is to be mounted on the frame 57, an auxiliary member 58 having the same shape as the lens frame 57 may be placed between the condenser lens unit 54' and the lens frame 57 as shown in FIG. 6B. The use of the auxiliary member makes it possible to mount the condenser lens unit 54' on the same lens frame 57 that is used with the larger diameter lens unit 54 without affecting the center position of the condenser lens unit 54'. In this case, if both condenser lens units 54 and 54' have the same object-to-imaging position distance, two or more types of condenser lens units 54 and 54' can be used on one mirror frame 56.

However, the lens frame 57 is one of the portions requiring high accuracy. Attaching the auxiliary member 58 to the lens frame 57 can cause an error in the shape of the lens frame 57 to combine with an error in the shape of the auxiliary member 58. This causes a deterioration of accuracy in mounting the condenser lens unit 54'. As a result, there has been a problem in that a reflected light beam R for reading fails to enter the light receiving unit 55 accurately and a resolution failure occurs. Therefore, when two or more types of condenser lens units 54 and 54' are used on one type of mirror frame 56 using the auxiliary member 58, the use of the lens unit 54' together with the auxiliary member 58 reduces the accuracy.

In the preferred embodiment, since the lens frame 18 is V-shaped and the outside shape of the condenser lens unit 19 (19') is cylindrical, a condenser lens unit of different diameter can be attached to the lens frame 18 without shifting a center of the lens horizontally, as shown in FIGS. 3A and 3B. In other words, when condenser lens units of varying diameter are attached, a center of each condenser lens unit shifts only vertically.

Figure 4:
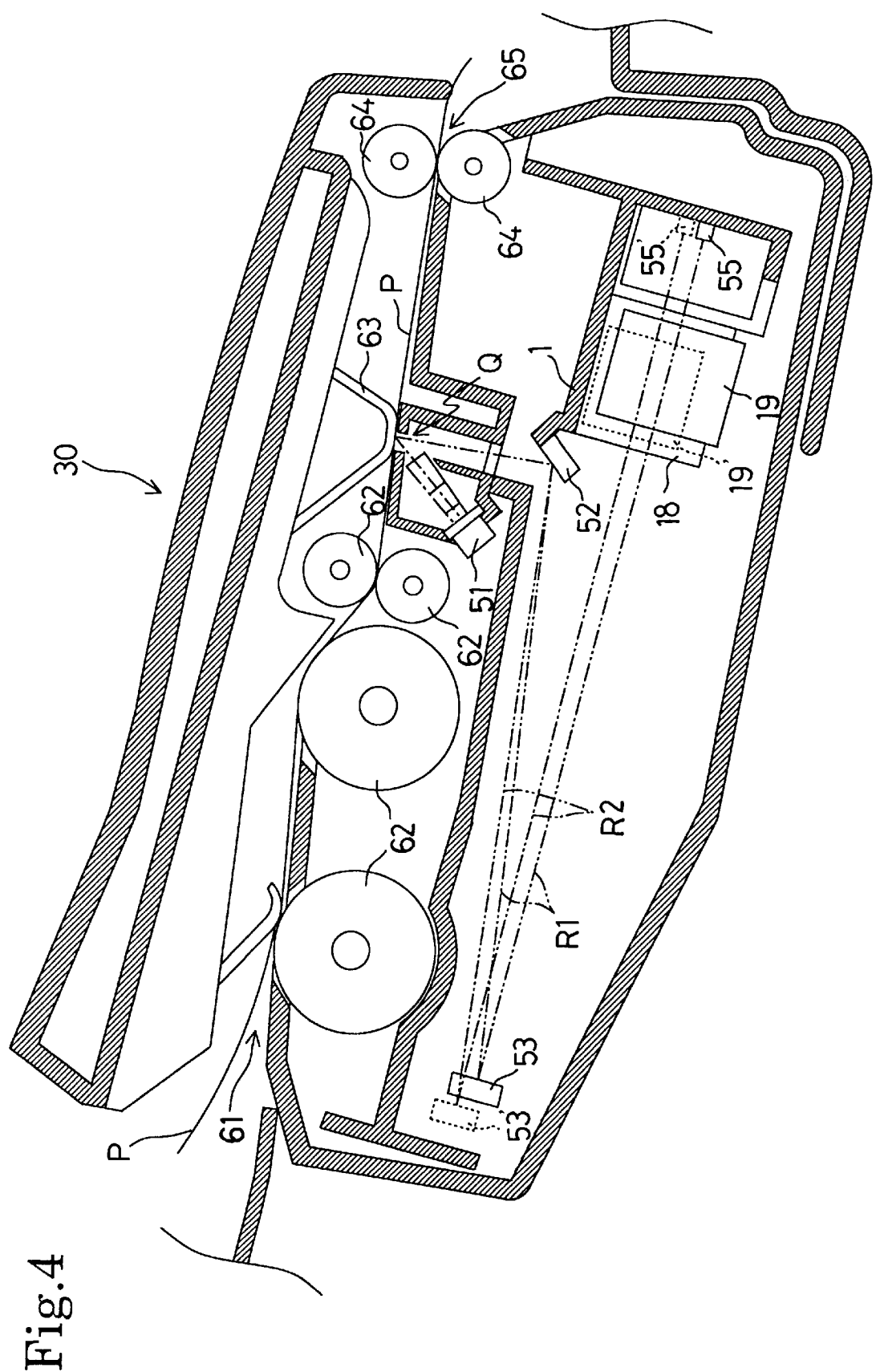
FIG. 4 is a partial sectional side view of an image reading device embodying the invention.

Referring now to FIG. 4, described below is a case where two types of condenser lens units 19 and 19' are used in the image reading device 30 in a preferred embodiment. The mirror frame 1 of the image reading device 30 has, as holders of the second reflection mirror 53 (53'), a second pair of mirror holders 14A and 14B and a first pair of mirror holders 7A and 7B, which are provided at two different locations. Thus, the mounting position of the second reflection mirror 53 (53') can be changed according to the condenser lens unit 19 (19') to be used. Consequently, two types of condenser lens units 19 and 19' can be used on one type of mirror frame.

When the condenser lens unit 19, as shown in FIG. 3A is used, the second reflection mirror 53 is mounted on the second pair of mirror holders 14A and 14B on the mirror frame 1 (Refer to FIG. 2). A light beam emitted from the light emitting unit 51 is reflected from the surface of the document P and enters the condenser lens unit 19 as the reflected light beam R1, via the first reflection mirror 52 and the second reflection mirror 53. Since the vertical positioning ribs 13A and 13B and the reflection surface positioning ribs 12A and 12B of the second pair of mirror holders 14A and 14B are made in accordance with the condenser lens unit 19, the reflected light beam R1, which has been reflected by the second reflection mirror 53, enters the condenser lens unit 19 correctly. As a result, the reflected light beam R1 passes from the condenser lens unit 19 to the light receiving unit 55 accurately, and the image on the document P is read by the light receiving unit 55 without any resolution failures occurring.

On the other hand, when the condenser lens unit 19' shown in FIG. 3B is used, the second reflection mirror 53' is mounted on the first pair of mirror holders 7A and 7B on the mirror frame 1 (Refer to FIG. 1). A light beam emitted from the light emitting unit 51 is reflected from the surface of the document P and enters the condenser lens unit 19' as the reflected light beam R2, via the first reflection mirror 52 and the second reflection mirror 53'. Since the vertical positioning ribs 6A and 6B and the reflection surface positioning ribs 5A and 5B of the first pair of mirror holders 7A and 7B are made in accordance with the condenser lens unit 19', the reflected light beam R2, which has been reflected by the second reflection mirror 53', enters the condenser lens unit 19' correctly. As a result, the reflected light beam R2 passes from the condenser lens unit 19' to the light receiving unit 55' accurately, and the image on the document P is read by the light receiving unit 55' without any resolution failures occurring.

As is apparent from the above description, since the holders of the second reflection mirrors 53 and 53' are provided at two different locations on the mirror frame 1 of the image reading device 30, two types of condenser lens units 19 and 19', which vary in type and manufacturer, can be used on one type of mirror frame 1 without using any auxiliary member as shown in FIG. 6B.

In addition, since the second reflection mirror 53 (53') whose mounting position is changed according to the condenser lens unit 19 (19') to be used is the mirror which reflects the light beam into the condenser lens unit 19 (19'), adjustment of the path of the reflected light beam R1 (R2) and fabrication of the first mirror holders 7A and 7B and the second mirror holders 14A and 14B can be performed easily.

While a preferred embodiment has been described, such description is for illustrative purpose only, and it will be understood that various changes may be made therein to embody the invention without departing from the spirit of the invention. For example, although two types of condenser lens units can be used on one mirror frame in the above embodiment, use of three or four, or more types of condenser lens units on one mirror frame may be made possible Also, the same reflection mirror could be used in either pair of mirror holders.

What is claimed is:
1. An image reading device, comprising:
    a light emitting unit including at least one light emitting element that emits a light beam onto a document;
    at least one reflection mirror for changing the direction of a light beam reflected from a surface of a document;
    a mirror frame on which the at least one reflection mirror is mounted;
    at least one mirror holder attached to the mirror frame for holding the at least one reflection mirror, wherein the at least one mirror holder has at least two holding portions, and wherein each holding portion is capable of holding a reflection mirror at a different predetermined position;

a light receiving unit for receiving a light beam reflected by the at least one reflection mirror; and a condenser lens unit for focusing a light beam reflected by the at least one reflection mirror onto the light receiving unit.

2. The image reading device as claimed in claim 1, further comprising a lens frame for holding the condenser lens unit.

3. The image reading device as claimed in claim 2, wherein the lens frame is V shaped, wherein an exterior surface of the condenser lens unit is cylindrical, and wherein the condenser lens unit is mountable on the lens frame by pressing the exterior cylindrical surface of the condenser lens unit into the V shape of the lens frame.

4. The image reading device as claimed in claim 2, wherein the lens frame is integral with the mirror frame.

5. The image reading device as claimed in claim 1, wherein each of the at least two holding portions is capable of holding a reflection mirror that reflects directly into the condenser lens unit.

6. The image reading device as claimed in claim 1, wherein each of the at least two holding portions are designed to hold the same size reflection mirror.

7. The image reading device as claimed in claim 1, wherein each of the at least two holding portions are designed to hold different size reflection mirrors.

8. An image reading device, comprising:

a light emitting unit including at least one light emitting element that emits a light beam onto a document;

at least one reflection mirror for changing the direction of a light beam reflected from a surface of a document;

a mirror frame on which the at least one reflection mirror is mounted;

at least two mirror holders attached to the mirror frame for holding the at least one reflection mirror, wherein the number of mirror holders of the apparatus is greater than the number of reflection mirrors of the apparatus;

a light receiving unit for receiving a light beam reflected by the at least one reflection mirror; and a condenser lens unit for focusing a light beam reflected by the at least one reflection mirror onto the light receiving unit.

9. The image reading device as claimed in claim 8, wherein each of the at least two mirror holders are fixed to the mirror frame so as to hold a reflection mirror in different predetermined positions.

10. The image reading device as claimed in claim 8, further comprising a lens frame for holding the condenser lens unit.

11. The image reading device as claimed in claim 10, wherein the lens frame is V shaped, wherein an exterior surface of the condenser lens unit is cylindrical, and wherein the condenser lens unit is mounted on the lens frame by pressing the exterior cylindrical surface of the condenser lens unit into the V shape of the lens frame.

12. The image reading device as claimed in claim 10, wherein the lens frame is integral with the mirror frame.

13. The image reading device as claimed in claim 8, wherein the at least two mirror holders are designed to hold a reflection mirror that reflects a light beam directly into the condenser lens unit.

14. The image reading device as claimed in claim 8, wherein each of the at least two mirror holders are designed to hold the same size reflection mirror.

15. The image reading device as claimed in claim 8, wherein each of the at least two mirror holders are designed to hold different size reflection mirrors.

16. A reflection mirror holding frame for an image forming apparatus, comprising:

a frame;

a first mirror holder;

a second mirror holder; and a condenser lens unit holder for holding a condenser lens unit, wherein the first and second mirror holders are attached to the frame so as to hold a reflection mirror in different predetermined positions so that the reflection mirror reflects a light beam directly into the condenser lens unit.

17. The reflection mirror holding frame of claim 16, wherein a reflection mirror is mountable in either the first or the second mirror holder, and wherein the reflection mirror will reflect an incident light beam in different directions depending on which of the first and second mirror holders the mirror is mounted upon.

18. The reflection mirror holding frame of claim 16, wherein the first and second mirror holders are configured to mount different size reflection mirrors.

19. The reflection mirror holding frame of claim 16, wherein the first and second mirror holders are configured to mount the same size reflection mirror.

20. The reflection mirror holding frame of claim 16, wherein each of the first and second mirror holders comprise a pair of mirror holding portions.

* * * * *